United States Patent
Mallampati et al.

(10) Patent No.: US 12,296,970 B2
(45) Date of Patent: May 13, 2025

(54) COWL SEAL ASSEMBLY FOR AN AIRCRAFT PROPULSION SYSTEM

(71) Applicant: Rohr, Inc., Chula Vista, CA (US)

(72) Inventors: Pratap Mallampati, Bengaluru (IN); Sree Divya Pochimireddy, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/217,182

(22) Filed: Jun. 30, 2023

(65) Prior Publication Data
US 2024/0101263 A1  Mar. 28, 2024

(30) Foreign Application Priority Data
Jul. 1, 2022 (IN) .............................. 202211038001

(51) Int. Cl.
  *B64D 29/08* (2006.01)
  *B64D 33/02* (2006.01)
  *F02K 1/80* (2006.01)
  *F02K 3/06* (2006.01)

(52) U.S. Cl.
  CPC .............. *B64D 29/08* (2013.01); *F02K 1/805* (2013.01); *F02K 3/06* (2013.01); *B64D 2033/0286* (2013.01); *F05D 2220/323* (2013.01)

(58) Field of Classification Search
  CPC .................................................... B64D 29/08
  See application file for complete search history.

(56) References Cited

U.S. PATENT DOCUMENTS

| | | | |
|---|---|---|---|
| 9,003,810 | B2 | 4/2015 | Porte |
| 10,221,765 | B2 | 3/2019 | Alstad |
| 11,066,179 | B2 | 7/2021 | Ramlaoui |
| 2005/0263643 | A1 | 12/2005 | Stretton |
| 2017/0284337 | A1* | 10/2017 | Schrell ................... B64D 29/06 |
| 2019/0300191 | A1 | 10/2019 | Porte |
| 2020/0290746 | A1* | 9/2020 | Kroeger ................. F16J 15/027 |

FOREIGN PATENT DOCUMENTS

| | | |
|---|---|---|
| EP | 3708498 B1 | 10/2022 |
| EP | 3733525 B1 | 8/2023 |

OTHER PUBLICATIONS

EP Search Report for EP Patent Application No. 23182706.4 dated Nov. 9, 2023.

* cited by examiner

*Primary Examiner* — David P. Olynick
(74) *Attorney, Agent, or Firm* — Getz Balich LLC

(57) ABSTRACT

An assembly for an aircraft propulsion system includes an upstream cowl and a downstream cowl. The upstream cowl extends axially from a first upstream end to a first downstream end. The upstream cowl includes an inner barrel panel, an outer barrel panel, and a bulkhead. The bulkhead extends radially between and connects the inner barrel panel and the outer barrel panel at the first downstream end. The downstream cowl extends axially from a second upstream end to a second downstream end. The downstream cowl includes a cowl panel and a seal assembly. The seal assembly includes a seal frame and a seal member. The seal frame is mounted to the bulkhead. The seal member is mounted to the cowl panel. The seal member includes a first radial portion projecting away from the cowl panel. The first radial portion is located at the second upstream end.

14 Claims, 4 Drawing Sheets

COWL SEAL ASSEMBLY FOR AN AIRCRAFT PROPULSION SYSTEM

This application claims priority to Indian Patent Appln. No. 202211038001 filed Jul. 1, 2022, which is hereby incorporated herein by reference in its entirety.

BACKGROUND

1. Technical Field

This disclosure relates generally to aircraft propulsion system nacelles and, more particularly, to cowl seal assemblies for nacelles.

2. Background Information

A propulsion system for an aircraft may include a nacelle which forms an exterior enclosure of the propulsion system. A nacelle may include one or more cowl doors to provide access to internal compartments or components of the propulsion system. Various types and configurations of cowl assemblies are known in the art. While these known cowl assemblies have various advantages, there is still room in the art for improvement. There is a need in the art, therefore, for an improved cowl assembly for aircraft propulsion system nacelles.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system having an axial centerline includes an upstream cowl and a downstream cowl. The upstream cowl extends circumferentially about the axial centerline. The upstream cowl further extends axially from a first upstream end to a first downstream end. The upstream cowl includes an inner barrel panel, an outer barrel panel, and a bulkhead. The bulkhead extends radially between and connects the inner barrel panel and the outer barrel panel at the first downstream end. The downstream cowl extends circumferentially about the axial centerline. The downstream cowl further extends axially from a second upstream end to a second downstream end. The second upstream end is positioned axially adjacent the first downstream end. The downstream cowl includes a cowl panel and a seal assembly. The cowl panel is movable between an open position and a closed position. The seal assembly includes a seal frame and a seal member. The seal frame is mounted to the bulkhead radially inward of the cowl panel. The seal member is mounted to the cowl panel. The seal member includes a first radial portion projecting away from the cowl panel to a distal end of the first radial portion. The first radial portion is located at the second upstream end.

In any of the aspects or embodiments described above and herein, the seal frame may further include a second radial portion and the second radial portion may be mounted to the bulkhead.

In any of the aspects or embodiments described above and herein, the seal frame may include an oblique portion and a second axial portion. The oblique portion may be located axially between the bulkhead and the axial portion. The oblique portion may be axially aligned with the first radial portion.

In any of the aspects or embodiments described above and herein, with the cowl panel in the closed position, the distal end may be radially spaced outward of the oblique portion.

In any of the aspects or embodiments described above and herein, the seal member may further include a first axial portion mounted to the cowl panel. The first radial portion may project away from the first axial portion.

In any of the aspects or embodiments described above and herein, the first axial portion is located axially aft of the first radial portion.

In any of the aspects or embodiments described above and herein, the seal assembly may further includes a rub strip. With the cowl panel in the closed position, the rub strip may be located between and configured to contact the first axial portion and the second axial portion.

In any of the aspects or embodiments described above and herein, the cowl panel may include a first material and the seal member may include a second material. The second material may be different than the first material.

In any of the aspects or embodiments described above and herein, the first radial portion may be axially spaced from the bulkhead.

According to another aspect of the present disclosure, an aircraft propulsion system includes a fan and an enclosure. The fan is rotatable about a rotational axis. The enclosure extends circumferentially about the rotational axis. The enclosure radially circumscribes the fan. The enclosure includes an intake cowl and a fan cowl. The intake cowl forms a propulsion system inlet upstream of the fan. The intake cowl extends axially from a first upstream end to a first downstream end. The intake cowl includes an inner barrel panel, an outer barrel panel, and a bulkhead. The bulkhead extends radially between and connects the inner barrel panel and the outer barrel panel at the first downstream end. The fan cowl extends axially from a second upstream end to a second downstream end. The second upstream end is positioned axially adjacent the first downstream end. The fan cowl includes a cowl panel and a seal assembly. The cowl panel is movable between an open position and a closed position. The seal assembly includes a seal member. The seal member includes a first axial portion and a first radial portion. The first radial portion projects away from the cowl panel to a distal end of the first radial portion. The first radial portion is located at the second upstream end.

In any of the aspects or embodiments described above and herein, the fan cowl may further include a seal frame, the seal frame mounted to the bulkhead radially inward of the seal member.

In any of the aspects or embodiments described above and herein, the seal frame may include an oblique portion and a second axial portion. The oblique portion may be located axially between the bulkhead and the axial portion. The oblique portion may be axially aligned with the first radial portion.

In any of the aspects or embodiments described above and herein, with the cowl panel in the closed position, the distal end may be radially spaced outward of the oblique portion.

In any of the aspects or embodiments described above and herein, the cowl panel may include a first material and the seal member may include a second material. The second material may be different than the first material.

In any of the aspects or embodiments described above and herein, the seal assembly may further include a rub strip.

With the cowl panel in the closed position, the rub strip may be located between and configured to contact the first axial portion and the second axial portion.

According to another aspect of the present disclosure, an assembly for an aircraft propulsion system having an axial centerline includes an upstream cowl and a downstream cowl. The upstream cowl extends circumferentially about the axial centerline. The upstream cowl further extends axially from a first upstream end to a first downstream end. The upstream cowl includes a bulkhead extending radially along the first downstream end. The downstream cowl extends circumferentially about the axial centerline. The downstream cowl further extends axially from a second upstream end to a second downstream end. The second upstream end is positioned axially adjacent the first downstream end. The downstream cowl includes a cowl panel and a seal assembly. The seal assembly includes a seal frame and a seal member. The seal member is mounted to the cowl panel. The seal member includes a first radial portion projecting away from the cowl panel to a distal end of the first radial portion. The seal frame is mounted to the bulkhead. The seal frame includes an oblique portion and a second axial portion located axially aft of the oblique portion. The first radial portion located axially between and spaced from the bulkhead and the oblique portion.

In any of the aspects or embodiments described above and herein, the seal frame may further include a second radial portion. The second radial portion may be mounted to the bulkhead.

In any of the aspects or embodiments described above and herein, the seal member may further include a first axial portion mounted to the cowl panel. The first radial portion may project away from the first axial portion. The seal assembly may further include a rub strip. The rub strip may be located between and configured to contact the first axial portion and the second axial portion.

In any of the aspects or embodiments described above and herein, the cowl panel may include a first material and the seal member may include a second material. The second material may be different than the first material.

In any of the aspects or embodiments described above and herein, the distal end may be radially spaced outward of the oblique portion.

The present disclosure, and all its aspects, embodiments and advantages associated therewith will become more readily apparent in view of the detailed description provided below, including the accompanying drawings.

DETAILED DESCRIPTION

Figure 1:
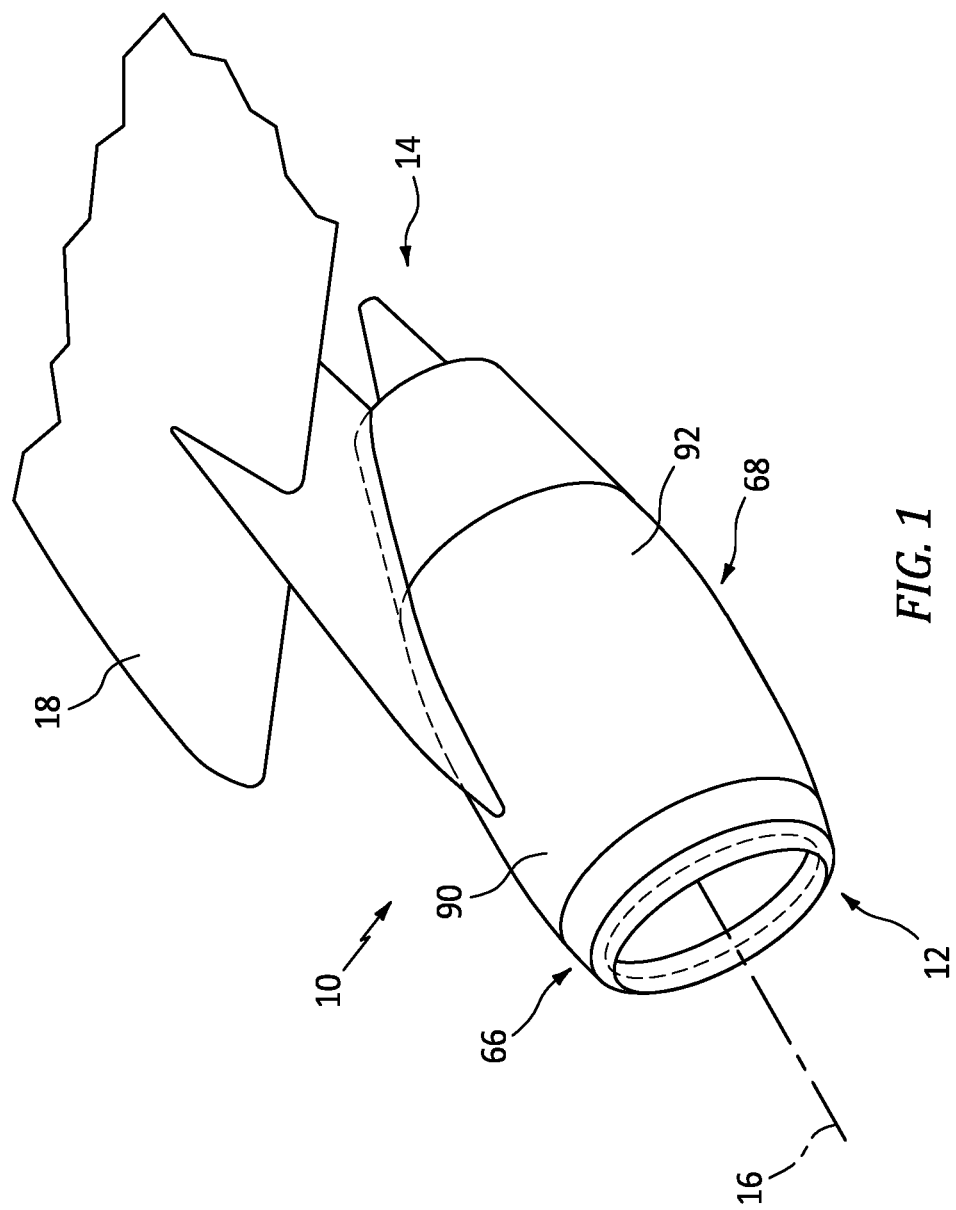
FIG. 1 illustrates a perspective view of an aircraft propulsion system, in accordance with one or more embodiments of the present disclosure.

FIG. 1 illustrates a perspective view of a propulsion system 10 for an aircraft. The propulsion system 10 extends axially between and to a forward end 12 and an aft end 14 relative to an axial centerline 16 of the propulsion system 10. The propulsion system 10 of FIG. 1 is mounted to a wing 18 of an aircraft (e.g., by a pylon). However, the propulsion assembly 10 of the present disclosure is not limited to wing-mounted propulsion assembly configurations.

Figure 2:
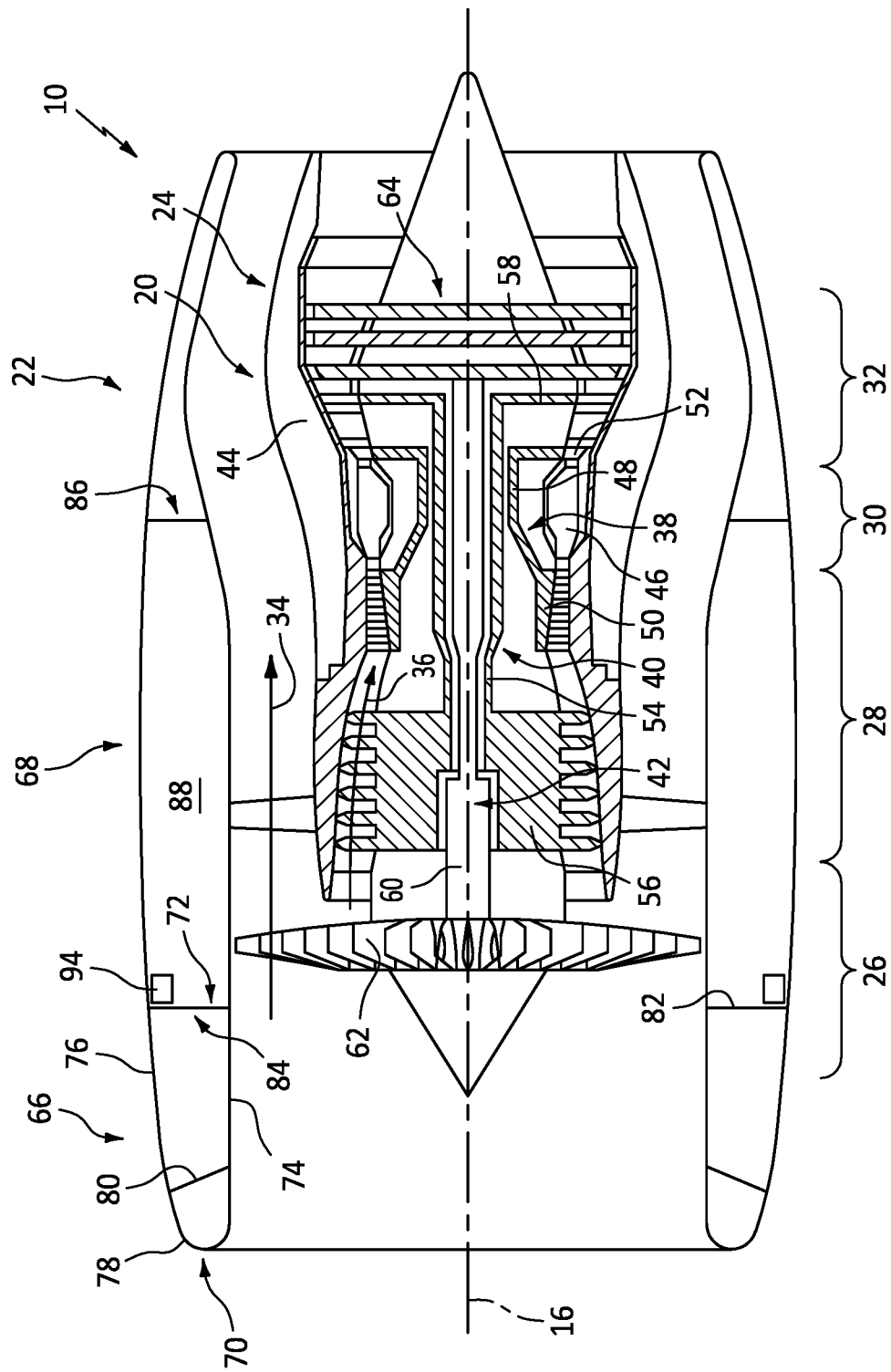
FIG. 2 illustrates a schematic cutaway view of the aircraft propulsion system of FIG. 1 including a gas turbine engine, in accordance with one or more embodiments of the present disclosure.

FIG. 2 illustrates a schematic cutaway view of the propulsion system 10. The propulsion system 10 of FIG. 2 includes a propulsion assembly 20 and an enclosure 22 (e.g., a nacelle). The propulsion assembly 20 of FIG. 2 is configured as a gas turbine engine 24. However, the propulsion assembly 20 of the present disclosure is not limited to use with gas turbine engines and may alternatively include other propulsion assembly configurations such as, but not limited to, an electric-motor-driven ducted fan.

The gas turbine engine 24 of FIG. 2 is a multi-spool turbofan gas turbine engine. However, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. The gas turbine engine 24 of FIG. 2 includes a fan section 26, a compressor section 28, a combustor section 30, and a turbine section 32. The fan section 26 drives air along a bypass flow path 34 while the compressor section 28 drives air along a core flow path 36 for compression and communication into the combustor section 30 and then expansion through the turbine section 32.

The gas turbine engine 24 of FIG. 2 includes a first rotational assembly 38 (e.g., a high-pressure spool), a second rotational assembly 40 (e.g., an intermediate-pressure spool), a third-rotational assembly 42 (e.g., a low-pressure spool), and an engine static structure 44 (e.g., an engine case), and an annular combustor 46. It should be understood that "low pressure," "intermediate pressure," and "high pressure" or variations thereof as used herein are relative terms indicating that the high pressure is greater than the intermediate pressure and the intermediate pressure is greater than the low pressure. The first rotational assembly 38, the second rotational assembly 40, and the third rotational assembly 42 of FIG. 2 are mounted for rotation about the axial centerline 16 (e.g., a rotational axis) relative to the engine static structure 44. In some embodiments, the first rotational assembly 38, the second rotational assembly 40, and/or the third rotational assembly 42 may alternatively be configured for rotation about a rotational axis which is different than the axial centerline 16.

The first rotational assembly 38 includes a first shaft 48, a bladed first compressor rotor 50, and a bladed first turbine rotor 52. The first shaft 48 interconnects the bladed first compressor rotor 50 and the bladed first turbine rotor 52. The second rotational assembly 40 includes a second shaft 54, a bladed second compressor rotor 56, and a bladed second turbine rotor 58. The second shaft 54 interconnects the bladed second compressor rotor 56 and the bladed second turbine rotor 58. The third rotational assembly 42 includes a third shaft 60, a fan 62, and a bladed third turbine rotor 64. The third shaft 60 interconnects the fan 62 and the bladed third turbine rotor 64. The annular combustor 46 is disposed between the bladed first compressor rotor 50 and the bladed first turbine rotor 52 along the core flow path 36.

In operation, airflow along the core flow path 36 is ingested by the fan 62, compressed by the bladed first compressor rotor 50 and the bladed second compressor rotor 56, mixed and burned with fuel in the combustor 46, and then expanded across the bladed first turbine rotor 52, the bladed second turbine rotor 58, and the bladed third turbine rotor 64. The bladed first turbine rotor 52, the bladed second turbine rotor 58, and the bladed third turbine rotor 64 rotationally drive the first rotational assembly 38, the second rotational assembly 40, and the third rotational assembly 42, respectively, in response to the expansion of the combustion gases. The first shaft 48, the second shaft 54, and the third shaft 60 of FIG. 2 are concentric and rotate about the axial centerline 16.

Figure 3:
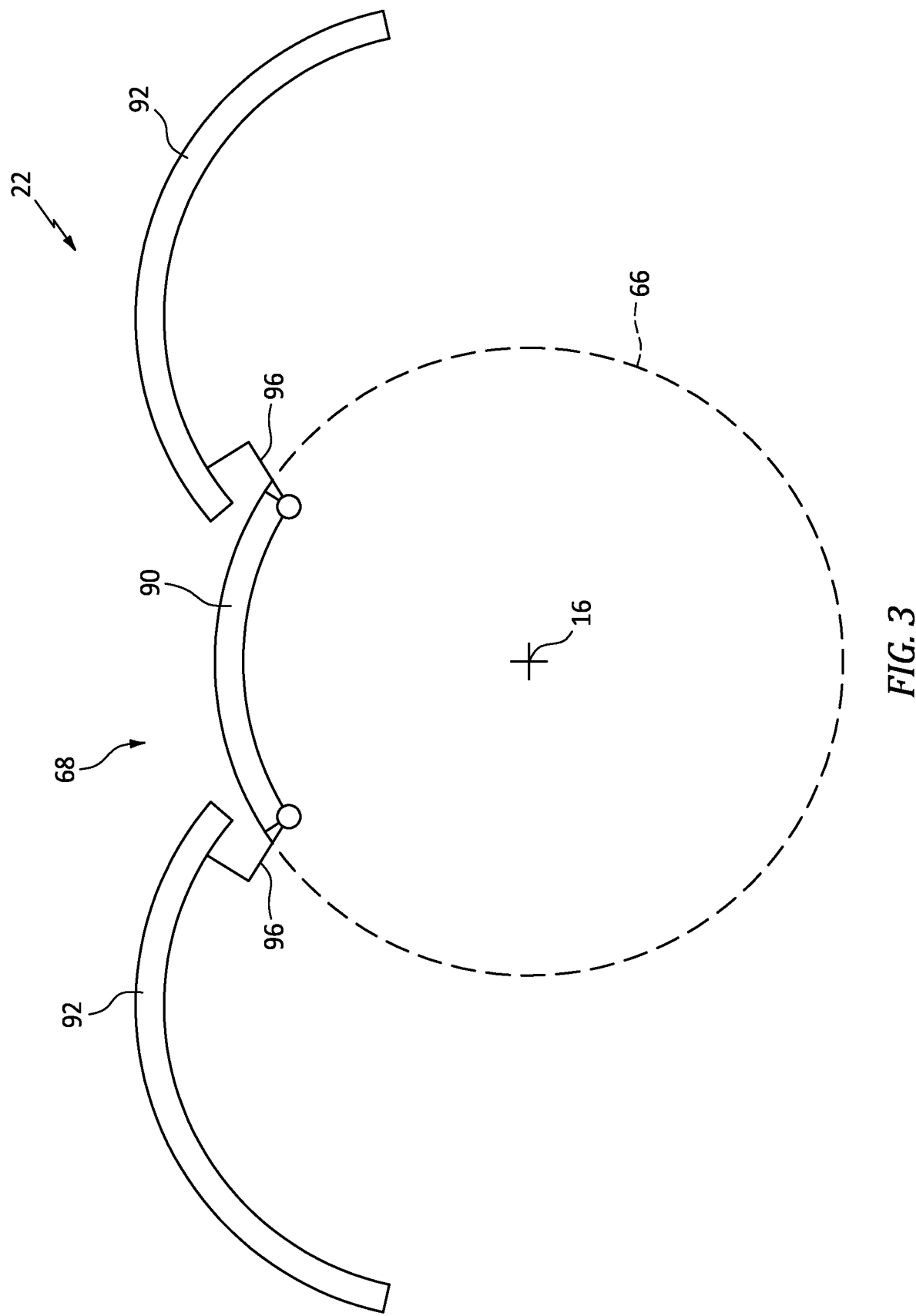
FIG. 3 illustrates a front cutaway view of an enclosure for the aircraft propulsion system of FIG. 1, in accordance with one or more embodiments of the present disclosure.

Referring to FIGS. 1-3, the enclosure 22 includes an intake cowl 66 (e.g., an upstream cowl) and a fan cowl 68 (e.g., a downstream cowl). The intake cowl 66 extends circumferentially about (e.g., completely around) the axial centerline 16. The intake cowl 66 further extends axially between and to an upstream end 70 of the intake cowl 66 and a downstream end 72 of the intake cowl 66. The upstream end 70 is located at (e.g., on, adjacent, or proximate) the forward end 12 (see FIG. 1). The intake cowl 66 of FIG. 2 includes an inner barrel panel 74, and outer barrel panel 76, a lip skin 78, a forward bulkhead 80, and an aft bulkhead 82. The inner barrel panel 74 forms at least a portion of an interior passageway (e.g., the bypass flow path 34) through which air enters the propulsion system 10. The outer barrel panel 76 forms at least a portion of an exterior of the enclosure 22. The lip skin 78 of extends between and connects the inner barrel panel 74 and the outer barrel panel 76. The lip skin 78 forms a forward leading edge of the intake cowl 66 at (e.g., on, adjacent, or proximate) the forward end 12 (see FIG. 1). The forward bulkhead 80 extends (e.g., radially extends) between and connects the inner barrel panel 74 and the outer barrel panel 76 proximate the lip skin 78. The forward bulkhead 80 may alternatively extend between and connect opposing (e.g., radially opposing) portions of the lip skin 78. The forward bulkhead 80 may include one or more panels arranged circumferentially about (e.g., completely around) the axial centerline 16. The aft bulkhead 82 extends (e.g., radially extends) between and connects the inner barrel panel 74 and the outer barrel panel 76 at (e.g., on, adjacent, or proximate) the downstream end 72. The aft bulkhead 82 may be formed by one or more panels arranged circumferentially about (e.g., completely around) the axial centerline 16.

The fan cowl 68 extends circumferentially about (e.g., completely around) the axial centerline 16. The fan cowl 68 radially circumscribes the fan 62. The fan cowl 68 further extends axially between and to an upstream end 84 of the fan cowl 68 and a downstream end 86 of the fan cowl 68. The upstream end 84 is positioned at (e.g., on, adjacent, or proximate) the downstream end 72. The fan cowl 68 forms an outer radial boundary of a fan cowl compartment 88, which fan cowl compartment 88 is located aft of the aft bulkhead 82. The fan cowl 68 includes a fixed cowl portion 90, at least one cowl panel 92 (e.g., a cowl door), and a seal assembly 94.

The fixed cowl portion 90 of FIGS. 1 and 3 is fixed relative to the intake cowl 66 and the axial centerline 16. The fixed cowl portion 90 may form a circumferential portion of the fan cowl 68. The propulsion system 10 may be mounted to an aircraft at (e.g., on, adjacent, or proximate) the fixed cowl portion 90 (see FIG. 1).

The cowl panel 92 may be moveably mounted to the fixed cowl portion 90. The fan cowl 68 of FIG. 3 includes two cowl panels 92 moveably mounted to the fixed cowl portion 90. For example, each cowl panel 92 of FIG. 3 is rotatably mounted to the fixed cowl portion 90 by at least one hinge 96 (e.g., a gooseneck hinge). The cowl panel 92 is moveable between an open position (see FIG. 3) and a closed position (see FIG. 1). In the open position, the cowl panel 92 may facilitate access to the fan cowl compartment 88 and one or more sections or components of the propulsion assembly 20. As used herein, a "closed position" will be used to refer to the cowl panel 92 in a position so as to form a substantially continuous exterior surface of the enclosure 22 (e.g., the cowl panel 92 is positioned for flight). The "open position" will be used to refer to the cowl panel 92 in a position other than the closed position (e.g., the cowl panel 92 is partially open, fully open, etc.). The cowl panel 92 includes a panel material. The panel material may form all or a substantial portion of the cowl panel 92. Examples of the panel material may include, but are not limited to, aluminum, titanium, and composite materials (e.g., thermoplastic composite materials), however, the present disclosure is not limited to any particular material for the panel material.

Figure 4:
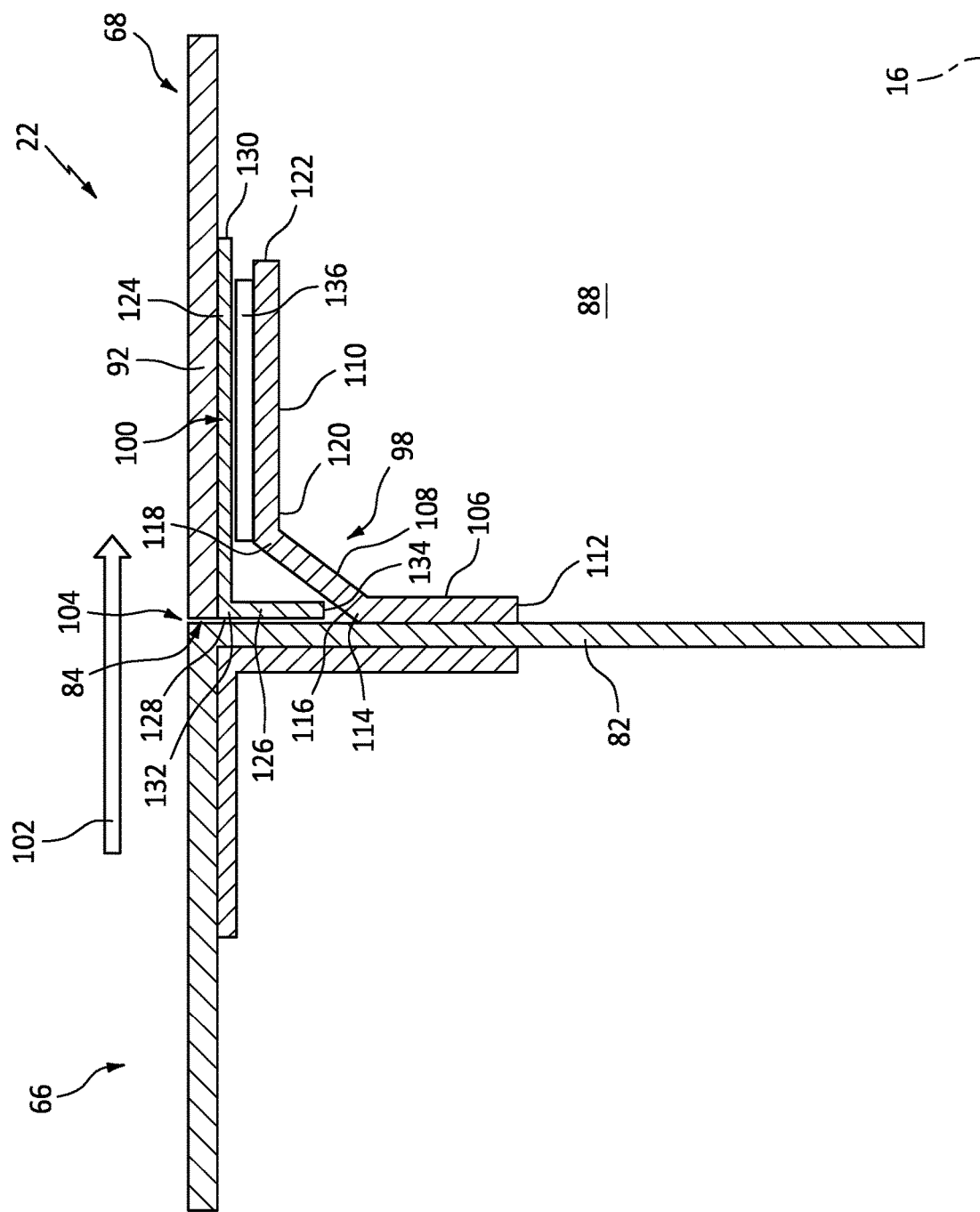
FIG. 4 illustrates a partial side sectional view of an assembly for the aircraft propulsion system of FIG. 1, in accordance with one or more embodiments of the present disclosure.

Referring to FIG. 4, a partial side sectional view of portions of the enclosure 22 including the intake cowl 66 as well as the fan cowl 68 and its seal assembly 94 is illustrated. FIG. 4 illustrates the cowl panel 92 in the closed position. The seal assembly 94 of FIG. 4 includes a seal frame 98 and a seal member 100. The seal assembly 94 is configured to reduce or prevent the entry of ambient air (e.g., air flowing along the enclosure 22 in airflow direction 102) into the fan cowl compartment 88, for example, through an axial gap 104 between the intake cowl 66 and the fan cowl 68.

The seal frame 98 of FIG. 4 is located within the fan cowl compartment 88 radially inward of the cowl panel 92 at (e.g., on, adjacent, or proximate) the upstream end 84. The seal frame 98 extends circumferentially about (e.g., partially or completely around) the axial centerline 16. The seal frame 98 includes a radial portion 106, an oblique portion 108, and an axial portion 110.

The radial portion 106 of FIG. 4 extends between and to a first end 112 of the radial portion 106 and a second end 114 of the radial portion 106 opposite the first end 112. The second end 114 is located radially outward of the first end 112. The radial portion 106 extends in a substantially radial direction from the first end 112 to the second end 114. As used herein, the term "substantially" with regard to an angular relationship refers to the noted angular relationship +/−15 degrees. The radial portion 106 of FIG. 4 is mounted (e.g., fixedly mounted) to the aft bulkhead 82. The radial portion 106 may be configured as a flange for facilitating mounting of the seal frame 98 to the aft bulkhead 82. The radial portion 106 may be mounted to the aft bulkhead 82, for example, by one or more fasteners (not shown), by welding, by bonding, etc. In some embodiments, the radial portion 106 may be unitarily formed with the aft bulkhead 82 such that the aft bulkhead 82 forms all or a substantial portion of the radial portion 106.

The oblique portion 108 of FIG. 4 extends between and to a first end 116 of the oblique portion 108 and a second end 118 of the oblique portion 108 opposite the first end 116. The first end 116 is located at (e.g., on, adjacent, or proximate) the second end 114. The second end 118 is located radially outward of the first end 116. The second end 118 is additionally spaced from (e.g., axially spaced from) the aft bulkhead 82. The oblique portion 108 may have a radial component (e.g., a non-zero radial component) and an axial component (e.g., a non-zero axial component). The oblique portion 108 may thereby be understood to extend obliquely (e.g., diagonally) from the first end 116 to the second end 118.

The axial portion 110 of FIG. 4 extends between and to a first end 120 of the axial portion 110 and a second end 122 of the axial portion 110 opposite the first end 120. The first end 120 is located at (e.g., on, adjacent, or proximate) the second end 118. The second end 122 is located axially aft of the first end 120. The axial portion 110 extends in a substantially axial direction from the first end 120 to the second end 122.

The seal member 100 of FIG. 4 is located radially between the fan cowl 68 (e.g., the cowl panel 92) and the seal frame 98 at (e.g., on, adjacent, or proximate) the upstream end 84. The seal member 100 extends circumferentially about (e.g., partially around) the axial centerline 16. The seal member 100 may be circumferentially segmented (e.g., the seal member 100 may include one or more circumferential gaps). The seal member 100 includes an axial portion 124 and a radial portion 126. The axial portion 124 and the radial portion 126 may form an "L" shape of the seal member 100, for example, where the radial portion 126 extends substantially perpendicular to the axial portion 124. The seal member 100 includes a seal material. The seal material may form all or a substantial portion of the seal member 100. The seal material may be different than the panel material. The seal material has sufficient stiffness (e.g., the extent to which a material resists deformation in response to an applied force) to substantially maintain the shape of the seal member 100 in response to the air flow (e.g., high-velocity air flow) into the axial gap 104. Examples of the seal material may include, but are not limited to, corrosion-resistant steel (CRES, e.g., stainless steel), polyether ether ketone (PEEK), and the like. The present disclosure, however, is not limited to any particular material or combination of materials for the seal member 100.

The axial portion 124 of FIG. 4 extends between and to a first end 128 of the axial portion 124 and a second end 130 of the axial portion 124 opposite the first end 128. The first end 128 is located at (e.g., on, adjacent, or proximate) the upstream end 84. The second end 130 is located aft of the first end 128. The axial portion 124 extends substantially axially from the first end 128 to the second end 130. The axial portion 124 is mounted to the fan cowl 68. For example, the axial portion 124 of FIG. 4 is mounted to the cowl panel 92. The axial portion 124 may additionally be mounted to portions of the fixed cowl portion 90. The axial portion 124 may be mounted to the fan cowl 68, for example, by one or more fasteners (not shown), by welding, by bonding, etc. In some embodiments, the axial portion 124 may be unitarily formed with the fan cowl 68 (e.g., the cowl panel 92) such that the fan cowl 68 forms all or a substantial portion of the axial portion 124.

The radial portion 126 of FIG. 4 extends between and to a proximate end 132 of the radial portion 126 and a distal end 134 of the radial portion 126. The proximate end 132 is located at (e.g., on, adjacent, or proximate) the first end 128. The distal end 134 is located radially inward of the proximate end 132. The seal member 100 and its radial portion 126 may be spaced (e.g., axially spaced) from the intake cowl 66 (e.g., the outer barrel panel 76 and the aft bulkhead 82) to form a first axial clearance between the intake cowl 66 and the radial portion 126. In some embodiments, for example, the axial clearance may be at least 5 millimeters (mm). In some embodiments, for example, the axial clearance may be between 5 mm and 10 mm. The radial portion 126 may be axially aligned with the oblique portion 108. In the closed position the radial portion 126 may also be spaced (e.g., axially spaced) from the oblique portion 108 to form a second axial clearance between the seal frame 98 and the radial portion 126. For example, the distal end 134 of FIG. 4 is axially positioned between and spaced from the aft bulkhead 82 and the oblique portion 108 with the cowl panel 92 in the closed position. The radial portion 126 has a length (e.g., a radial length) L extending from the proximate end 132 to the distal end 134. The length L is such that the distal end 134 is spaced (e.g., radially spaced) from the oblique portion 108 with the cowl panel 92 in the closed position. The axial and radial clearances may be sufficient to prevent clashing (e.g., physical contact) between the radial portion 126 with the intake cowl 66 and/or the seal frame 98 as the cowl panel 92 is moved from the open position to the closed position and from the closed position to the open position.

In some embodiments, the seal assembly 94 may include a rub strip 136 located between the seal frame 98 and the seal member 100. With the cowl panel 92 in the closed position, the rub strip 136 may contact both the seal frame 98 and the seal member 100. The rub strip 136 may be configured to reduce or eliminate frictional wear which may otherwise result from physical contact (e.g., metal-to-metal contact) between the seal frame 98 and the seal member 100 as the seal frame 98 and seal member 100 move relative to one another (e.g., during operation of the propulsion system 10 (see FIGS. 1 and 2)). The rub strip 136 of FIG. 4 is located between the axial portion 110 and the axial portion 124. The rub strip 136 may extend circumferentially about the axial centerline 16 along a circumferential extent of the axial portion 110 and/or the axial portion 124. The rub strip 136 may be mounted (e.g., fixedly mounted) to the seal frame 98, for example, at (e.g., on, adjacent, or proximate) the axial portion 110. The rub strip 136 may alternative be mounted (e.g., fixedly mounted) to the seal member 100, for example, at (e.g., on, adjacent, or proximate) the axial portion 124. The rub strip 136 may include a low-friction and/or high-durability material. Examples of the rub strip 136 material may include, but are not limited to, polytetrafluoroethylene (PTFE), self-lubricating polymer-based wear strip materials sold by Kamatics Corp. under the registered trademark KARON, or another suitable low-friction and abrasion resistant material.

During flight conditions, cowls for at least some conventional aircraft propulsion systems may experience deformation (e.g., "scooping") as a result of force applied to the cowls by air flow along an exterior of the propulsion system. Deformation of the cowl structure may allow at least some air to flow into a cowl compartment bounded by the cowl, potentially resulting in significant air pressure differences between the exterior and the interior of the cowl. This relative difference in air pressures can substantially increase the structural load applied to the cowl. The seal assembly 94 of the present disclosure prevents or substantially prevents the flow of ambient air into the cowl compartment 88 formed, in part, by the fan cowl 68. Accordingly, the structural load experienced by the fan cowl 68 during operation of the propulsion system 10, as a result of differential air pressures, may be substantially reduced.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. An assembly for an aircraft propulsion system having an axial centerline, the assembly comprising:
an upstream cowl extending circumferentially about the axial centerline, the upstream cowl further extending axially from a first upstream end to a first downstream end, the upstream cowl including an inner barrel panel, an outer barrel panel, and a bulkhead, the bulkhead extending radially between and connecting the inner barrel panel and the outer barrel panel at the first downstream end; and
a downstream cowl extending circumferentially about the axial centerline, the downstream cowl further extending axially from a second upstream end to a second downstream end, the second upstream end positioned axially adjacent the first downstream end, the downstream cowl including a cowl panel and a seal assembly, the cowl panel being movable between an open position and a closed position, the seal assembly including a seal frame and a seal member, the seal frame including an oblique portion and a seal frame axial portion, the seal frame mounted to the bulkhead radially inward of the cowl panel, the seal member mounted to the cowl panel, the seal member including a seal member radial portion projecting away from the cowl panel to a distal end of the seal member radial portion, the seal member radial portion located at the second upstream end, and the oblique portion located axially between the bulkhead and the seal frame axial portion, the oblique portion axially aligned with the seal member radial portion;
wherein, with the cowl panel in the closed position, the distal end is radially spaced outward of the oblique portion.

2. The assembly of claim 1, wherein the seal frame further includes a seal frame radial portion, the seal frame radial portion mounted to the bulkhead.

3. The assembly of claim 1, wherein the seal member further includes a seal member axial portion mounted to the cowl panel, the seal member radial portion projecting away from the seal member axial portion.

4. The assembly of claim 3, wherein the seal member axial portion is located axially aft of the seal member radial portion.

5. The assembly of claim 4, wherein:
the seal assembly further includes a rub strip; and
with the cowl panel in the closed position, the rub strip is located between and configured to contact the seal member axial portion and the seal frame axial portion.

6. The assembly of claim 1, wherein the cowl panel comprises a first material and the seal member comprises a second material, the second material different than the first material.

7. The assembly of claim 1, wherein the seal member radial portion is axially spaced from the bulkhead.

8. An aircraft propulsion system comprising:
a fan rotatable about a rotational axis; and
an enclosure extending circumferentially about the rotational axis, the enclosure radially circumscribing the fan, the enclosure including:
an intake cowl forming a propulsion system inlet upstream of the fan, the intake cowl extending axially from a first upstream end to a first downstream end, the intake cowl including an inner barrel panel, an outer barrel panel, and a bulkhead, the bulkhead extending radially between and connecting the inner barrel panel and the outer barrel panel at the first downstream end; and
a fan cowl extending axially from a second upstream end to a second downstream end, the second upstream end positioned axially adjacent the first downstream end, the fan cowl including a cowl panel and a seal assembly, the cowl panel being movable between an open position and a closed position, the seal assembly including a seal frame and a seal member, the seal member including a seal member axial portion and a seal member radial portion, the seal member radial portion projecting away from the cowl panel to a distal end of the seal member radial portion, the seal member radial portion located at the second upstream end, the seal frame including an oblique portion and a seal frame axial portion, the seal frame mounted to the bulkhead radially inward of the seal member, the oblique portion located axially between the bulkhead and the seal frame axial portion, and the oblique portion axially aligned with the seal member radial portion;
wherein, with the cowl panel in the closed position, the distal end is radially spaced outward of the oblique portion.

9. The aircraft propulsion system of claim 8, wherein the cowl panel comprises a first material and the seal member comprises a second material, the second material different than the first material.

10. The aircraft propulsion system of claim 8, wherein:
the seal assembly further includes a rub strip; and
with the cowl panel in the closed position, the rub strip is located between and configured to contact the seal member axial portion and the seal frame axial portion.

11. An assembly for an aircraft propulsion system having an axial centerline, the assembly comprising:

an upstream cowl extending circumferentially about the axial centerline, the upstream cowl further extending axially from a first upstream end to a first downstream end, the upstream cowl including a bulkhead extending radially along the first downstream end; and a downstream cowl extending circumferentially about the axial centerline, the downstream cowl further extending axially from a second upstream end to a second downstream end, the second upstream end positioned axially adjacent the first downstream end, the downstream cowl including a cowl panel and a seal assembly, the seal assembly including a seal frame, a rub strip and a seal member, the seal member mounted to the cowl panel, the seal member including a seal member radial portion projecting away from the cowl panel to a distal end of the seal member radial portion, the seal member further including a seal member axial portion mounted to the cowl panel, the seal frame mounted to the bulkhead, the seal frame including an oblique portion and a seal frame axial portion located axially aft of the oblique portion, the seal member radial portion located axially between and spaced from the bulkhead and the oblique portion, the seal member radial portion projecting away from the seal member axial portion, and the rub strip located between and configured to contact the seal member axial portion and the seal frame axial portion.

12. The assembly of claim 11, wherein the seal frame further includes a seal frame radial portion, the seal frame radial portion mounted to the bulkhead.

13. The assembly of claim 11, wherein the cowl panel comprises a first material and the seal member comprises a second material, the second material different than the first material.

14. The assembly of claim 11, wherein the distal end is radially spaced outward of the oblique portion.

* * * * *